(12) United States Patent
Tissler et al.

(10) Patent No.: US 8,609,569 B2
(45) Date of Patent: Dec. 17, 2013

(54) ADSORBER UNIT FOR VOLATILE HYDROCARBONS COMPRISING AN ADSORBER MATERIAL MADE FROM AN IRON-CONTAINING MOLECULAR SIEVE

(75) Inventors: Arno Tissler, Tegernheim (DE); Roderick Althoff, Rosenheim (DE); Volker Kurth, Bad Aibling (DE)

(73) Assignee: Sued-Chemie IP GmbH & Co. KG, Munich (DE)

( * ) Notice: Subject to any disclaimer, the term of this patent is extended or adjusted under 35 U.S.C. 154(b) by 230 days.

(21) Appl. No.: 12/158,557

(22) PCT Filed: Dec. 7, 2006

(86) PCT No.: PCT/EP2006/011783
§ 371 (c)(1),
(2), (4) Date: Nov. 21, 2008

(87) PCT Pub. No.: WO2007/079852
PCT Pub. Date: Jul. 19, 2007

(65) Prior Publication Data
US 2009/0082194 A1 Mar. 26, 2009

(30) Foreign Application Priority Data

Dec. 22, 2005 (DE) .......................... 10 2005 061 713

(51) Int. Cl.
*B01J 29/00* (2006.01)
(52) U.S. Cl.
USPC .......................................................... 502/74
(58) Field of Classification Search
None
See application file for complete search history.

(56) References Cited

U.S. PATENT DOCUMENTS

| 5,676,912 | A | 10/1997 | Sharma et al. |
| 6,171,556 | B1 | 1/2001 | Burk et al. |
| 6,887,815 | B2 | 5/2005 | Tissler et al. |
| 7,259,121 | B2 | 8/2007 | Schwefer et al. |
| 2005/0196333 | A1 | 9/2005 | Schafer-Sindlinger et al. |

FOREIGN PATENT DOCUMENTS

| DE | 69328195 T2 | 9/2000 |
| EP | 0661098 A2 | 7/1995 |
| EP | 0955080 A1 | 11/1999 |
| EP | 1147801 A1 | 10/2001 |
| EP | 1297885 A | 4/2003 |
| JP | 2000167390 A | 6/2000 |
| WO | WO 01/43854 A | 6/2001 |

OTHER PUBLICATIONS

CH. Baerlocher, W.M. Meier and D.H. Olson: "Atlas of Zeolite Framework Types" [Online] 2001, Elsevier, XP002425913, ISBN: 0-444-50701-9, Retrieved from the Internet: URL: http://zeolites.ethz.ch/IZA-SC/Atlas_pdf/MFI.pdf> MFI Data Sheet.
Higashiyama, K. et al., "A Catalyzed Hydrocarbon Trap Using Metal-Impregnated Zeolite for SULEV systems," British Library, 2003, pp. 499-505.
Otremba, M. et al., "Temperature-Programmed Desorption of Aromatic Hydrocarbons From Zsm-5 Type Zeolites," React. Kinet. Catal. Letter., 1993, vol. 51, No. 2, pp. 473-479.

*Primary Examiner* — Milton I Cano
*Assistant Examiner* — Sarah A Slifka
(74) *Attorney, Agent, or Firm* — Millen, White, Zelano & Branigan, P.C.

(57) ABSTRACT

The invention relates to an adsorber unit for volatile hydrocarbons in order to control the emission of volatile hydrocarbons, comprising a hydrocarbon adsorber material, wherein the adsorber material is an iron-containing zeolite, which can be optionally promoted with monovalent metal ions. The invention further relates to a method for production of the adsorber material in question.

10 Claims, 1 Drawing Sheet

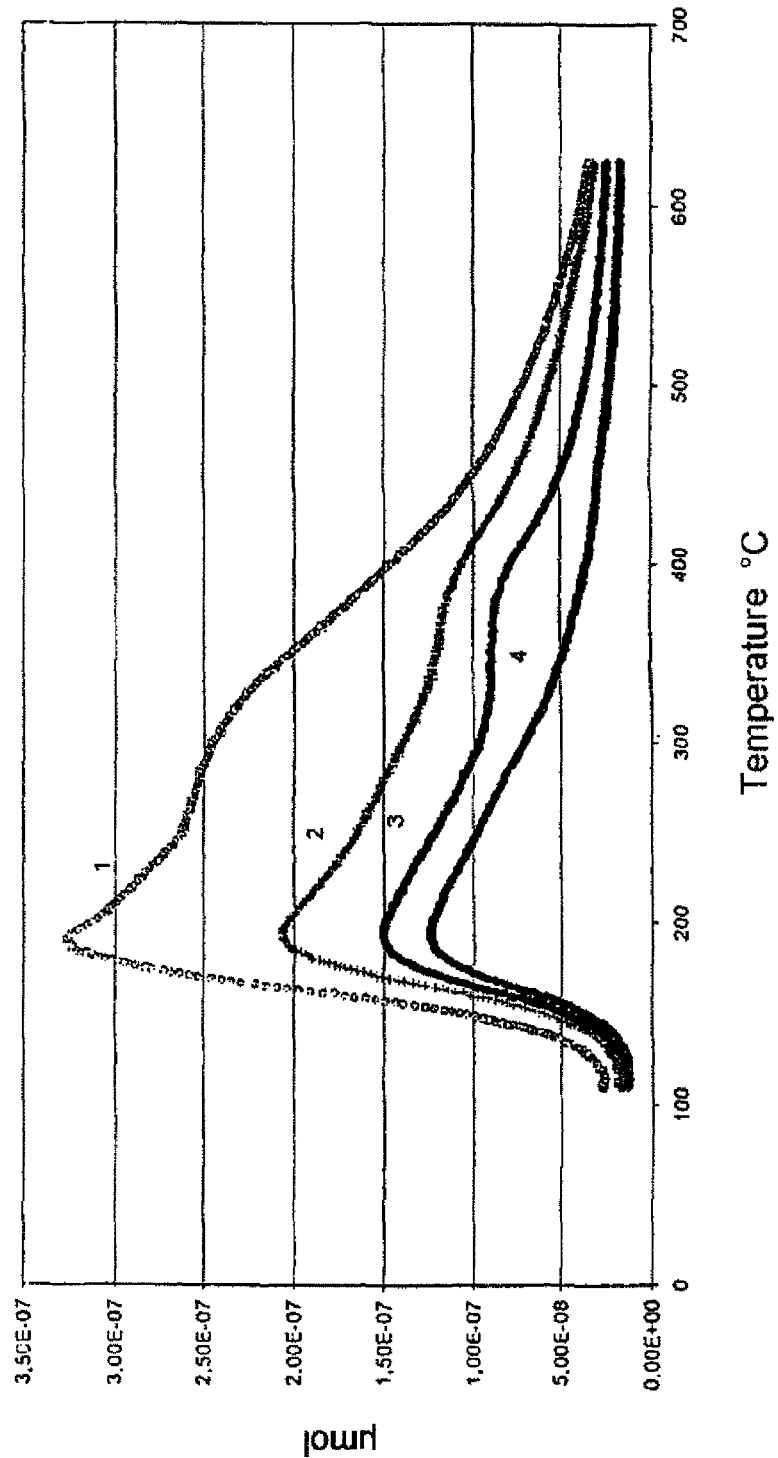

ADSORBER UNIT FOR VOLATILE HYDROCARBONS COMPRISING AN ADSORBER MATERIAL MADE FROM AN IRON-CONTAINING MOLECULAR SIEVE

This application is a 35 U.S.C. §371 National Stage Application of PCT/EP2006/011783, filed on Dec. 7, 2006, which claims the benefit of priority to Serial No. 10 2005 061 713.1, filed on Dec. 22, 2005 in Germany, the disclosures of which are incorporated herein by reference in their entirety.

The present invention relates to an adsorber unit for volatile hydrocarbons which comprises an adsorber material which consists essentially of an iron-containing molecular sieve.

Cold start hydrocarbon emissions are currently responsible for about 80% of hydrocarbons emitted by internal combustion engines. Numerous methods have already been proposed for reducing these emissions. The methods include the use of materials for adsorbing the hydrocarbons when the catalysts with which the motor vehicles are equipped are cold and inactive and for subsequently releasing these hydrocarbons again at higher temperatures when the catalyst has reached a sufficient operating temperature, such that it can convert the hydrocarbons to environmentally harmless products. The most promising adsorber materials to date are molecular sieves, especially zeolites.

It is known that zeolites can be used to reduce the hydrocarbon emissions on cold starting, for example by the mechanisms as described in US 2004/0094035A1.

Molecular sieves, especially zeolite materials, are crystalline inorganic oxide materials which typically consist of silicon and aluminum in atomic ratios of from 1:1 to 500:1. These materials are outstanding adsorbents in the cleaning of exhaust gases, since they are typically stable under the thermal conditions which exist in these applications. A multitude of different zeolite types have therefore already been studied for such applications, especially with regard to stability toward water, since zeolites are also very good water adsorbents according to the Si/Al ratio.

Higashiyama et al. (SAE Papers 2003-01-0815, page 45 to page 51) proposed increasing the desorption temperature of adsorbed hydrocarbons by impregnating a zeolite with a silver solution and then using it as an adsorber material in a cold start trap for a 3-way catalytic converter. In this study, eleven metals were tested as promoters for zeolite, and it was found that, with the exception of silver, all other metals studied, such as cerium, palladium, platinum and rhodium, give rise to poorer results, i.e. lower temperatures in relation to the temperature of the hydrocarbon desorption.

Exclusively in the case of silver-doped zeolites, it was found that the temperature is in the region of just above 250° C. Although the adsorption generally depends on the type of hydrocarbon to be adsorbed, only silver-doped zeolites have suitably high desorption temperatures for all hydrocarbons considered (both aromatic and nonaromatic).

It has also been found that the type of zeolite influences the desorption temperature. A multitude of zeolites for hydrocarbon adsorber units has been described in US 2004/0226440A1, where the zeolite is subjected to a steam treatment at a temperature of 350-900° C. before use, in order to bring about especially a better steam stability. The desorption of aromatic hydrocarbons from ZSM5-type zeolites has been described in detail by Otremba and Zaydel in "Reaction Kinetics Analysis Letters, Vol. 51, No. 2473-9 (1993)", and it has been found that the adsorption of aromatic hydrocarbons takes place especially at the Brønsted-acidic sites.

The problem underlying the invention therefore consisted in providing an adsorber unit comprising suitable adsorber materials for the adsorption of hydrocarbons, which permit desorption of the adsorbed hydrocarbons only at increased temperatures compared to the prior art. In the case of nonaromatic hydrocarbons, for which n-decane is often used as a reference, the term "elevated temperature" means a temperature of higher than at least 200° C., preferably higher than 250° C.; in the case of aromatic hydrocarbons such as benzene, toluene, xylene, etc., these are temperatures of more than 300° C., preferably of more than 350° C. The above-described problem of cold starting of internal combustion engines with regard to the emission of harmful hydrocarbons into the environment can thus be avoided.

This problem is solved by the provision of an adsorber unit for volatile hydrocarbons for controlling the emission of volatile hydrocarbons, comprising a hydrocarbon adsorber material which is an iron-containing molecular sieve and further comprises a metal in the +1 oxidation state. The description of the basic principle of an adsorber unit can be taken, for example, from US 2004/0094035 A1.

It has been found that, surprisingly, the doping of molecular sieves with iron leads to the desorption temperature of adsorbed hydrocarbons, and specifically both of aromatic and nonaromatic hydrocarbons, according to the hydrocarbon, is approx. 60-100° C. higher than those of the best catalysts which are known from the prior art and which consist, for example, of silver-doped zeolites. This is also true when the silver-doped zeolites known from the prior art are additionally promoted with iron.

The inventive adsorber unit thus has a particularly high efficiency and a reduced emission of hydrocarbons into the environment, since there is substantially complete conversion of the desorbed hydrocarbons over the usually noble metal-containing actual catalyst at the increased desorption temperature at which the hydrocarbons are desorbed on the inventive adsorber unit.

It is especially preferred that the molecular sieve is a molecular sieve based on silicon dioxide/aluminum dioxide/iron, where the ratio of $SiO_2/Al_2O_3$ is 10:1 to 100:1. This range of values of the ratio of $SiO_2/Al_2O_3$ ensures that the Brønsted acid strength and the number of Brønsted acid sites in the molecular sieve is high enough to enable efficient adsorption of hydrocarbons (both aromatic and nonaromatic).

The molecular sieve is more preferably a zeolite which is selected from zeolites of the ZSM-5 type (MFI), zeolite Y (FAU), zeolite BETA (BEA), chabazite (CHA), mordenite (MOR) and erionite (ERI), ZSM-11 (MEL), ZSM-12 (MTW), ZSM-23 (MTT). Particular preference is given to zeolites of the ZSM-5 type or BETA zeolites which have a ring opening which is formed from 8, 10 or 12 tetrahedra. Silicon-rich zeolites which are hydrophobic, i.e. organophilic, and are suitable for the inventive purpose have an Si/Al ratio of >5. ZSM-5-type zeolites with a particularly high silicon dioxide content are also referred to as silicalites (U.S. Pat. No. 4,297,328), and can likewise be used in the context of the present invention.

It has been found that, surprisingly, addition of a further metal in the +1 oxidation state shifts the desorption temperature for both aromatic and non-aromatic hydrocarbons to higher temperatures by another approximately 50° C. More particularly, the monovalent compounds of copper, of silver and of gold are particularly preferred. Most preferred is the use of silver.

In particularly preferred embodiments, the content of iron is from 0.1 to 10% by weight, based on the total weight of the adsorber material. In a particularly preferred embodiment, 1-3% by weight. The iron can be introduced in the form of solutions of divalent iron either by impregnation or by solid-state ion exchange, as described, for example, in U.S. Pat. No. 6,887,815B2 or in EP 0955080B1.

The amount of metal in the +1 oxidation state, i.e. preferably of silver, is from 0.1 to 2% by weight, preferably from 0.1 to 1.5% by weight, based on the total weight of the zeolite. The combination of the inventive amount of iron with the inventive amount of metal in the +1 oxidation state leads, in very particularly preferred embodiments of the invention, to the desorption temperatures for adsorbed hydrocarbons in some cases being up to 60-100° C. higher than in the case of cold start traps or adsorption materials for hydrocarbons from the prior art. The lower value for the increase in the aforementioned desorption temperature range relates to preferred nonaromatic, i.e. aliphatic, hydrocarbons, and the upper value to olefinic and aromatic hydrocarbons.

In a further aspect, the present invention provides a process for preparing a zeolite for use in an inventive adsorber unit, wherein
a) a dry mixture of ammonium salts or N-containing compounds, $NH_3/NH_4$ zeolites and an iron compound, and also a compound of a monovalent metal, is prepared,
b) the above components are mixed intimately in a mill and
c) heat treated at a temperature of at least 300° C., and
d) finally cooled to room temperature.

The inventive solid-state ion exchange allows the exact positioning of the iron ions or of the ions of the monovalent metal at the Brønsted-acidic internal lattice sites of the zeolite, while the application of iron from an aqueous phase leads more particularly also to the precipitation of colloidal iron hydroxide, which is deposited principally on the outer surface of the molecular sieve and is thus unusable for the purpose of the present invention, since adsorption of hydrocarbons proceeds in the interior of the zeolite at the Brønsted acid sites.

It is preferred that the zeolite material is of the ZSM-5 (MFI) or BETA type (BEA), which can especially also be used in the ammonium form in each case. For the iron ion exchange reaction, the ammonium form is very particularly preferred. The solid-state ion exchange reaction and its yield are positively influenced by the use of a nitrogen-containing atmosphere during the heat treatment. It is likewise preferred when the nitrogen-containing atmosphere is still ammonium-containing or amine-containing, which further enhances the yield of the solid-state ion exchange reaction. In further preferred embodiments, the solid-state ion exchange reaction can also be effected under elevated pressure.

The invention is illustrated further by the figure which follows. The figure shows FIG. 1: a diagram in which the desorption temperatures (as the acid strength measured in μmol as a function of temperature) of hydrocarbons of an iron-doped zeolite (Fe-BEA25) with addition of silver and those of an undoped zeolite (H-BEA25) are plotted.

The measurements were carried out by means of ammonium temperature-programmed desorption (TPD). The values obtained correlate to the values for the desorption temperature of hydrocarbons. Each curve typically has two signals (maxima), of which the integral over the first signal (maximum) is a measure of the number of weakly (Lewis-) acidic sites in the zeolite, which, however, release the hydrocarbons adsorbed at relatively low temperatures. The second signal (maximum) is a measure of the number and the desorption temperature of the Brønsted-acidic sites, from which the hydrocarbons are desorbed at the desired high temperatures.

Curve 1 shows the profile of the desorption for freshly calcined H-BEA25 zeolite. The desorption of hydrocarbons takes place in a temperature range of approx. 290-310° C. After artificial aging (800° C. for 24 h), as corresponds to real conditions for an adsorber unit, for example in a 3-way catalytic converter in a motor vehicle, curve 4 shows that almost no adsorption and hence also desorption takes place any longer: the first maximum is smaller by the factor of 3 than the first maximum in curve 1 and the second maximum has disappeared virtually completely in curve 4.

The iron-containing zeolite (5.5% by weight of $Fe_2O_3$ based on the overall zeolite) with addition of silver (1.5% by weight) Fe-BEA25 has a lower number of weakly acidic Lewis sites in the freshly calcined state (curve 2) compared to freshly calcined H-BEA 25. However, the hydrocarbons adsorbed at the strong Brønsted acid sites are not desorbed until the range of approx. 350-410° C. Aging of the Fe-BEA25 zeolites (curve 3), in contrast to aged H-BEA25 (curve 4), also does not lead to any significant reduction in the adsorption capacity or in the desorption temperature range. The use of an iron-containing zeolite in an adsorber unit thus enables both a shift of the desorption of hydrocarbons to higher temperatures and an increased long-term stability compared to non-iron-doped zeolites.

The invention claimed is:

1. An adsorber unit for volatile hydrocarbons for controlling the emission of volatile hydrocarbons, comprising a hydrocarbon adsorber material, wherein the adsorber material is an iron-containing molecular sieve and comprises a metal in the +1 oxidation state that is copper, silver or gold, wherein the content of iron is 0.1-10% by weight based on the total weight of the adsorber material, and wherein the proportion of the metal in the +1 oxidation state in the molecular sieve is 0.01-2% by weight based on the total weight of the molecular sieve, wherein the iron is introduced by solid state ion exchange, and the adsorber material has a desorption temperature for adsorbed hydrocarbons of 350° to 410° C.

2. The adsorber unit as claimed in claim 1, wherein the molecular sieve is a molecular sieve based on silicon dioxide/aluminum dioxide/iron which has a ratio of $SiO_2/Al_2O_3$ of from 10:1 to 100:1.

3. The adsorber unit as claimed in claim 2, wherein the molecular sieve is a zeolite which is ZSM-5 type, zeolite Y, zeolite BETA, chabazite, mordenite, erionite, ZSM-11, ZSM-12 or ZSM-23.

4. The adsorber unit as claimed in claim 3, wherein the zeolite is a zeolite of the ZSM-5 type or a BETA zeolite.

5. The adsorber unit as claimed in claim 3, wherein the zeolite has a ring opening formed from 8, 10 or 12 tetrahedra.

6. The adsorber unit as claimed in claim 1, wherein the content of iron is 1-3% by weight based on the total weight of the adsorber material.

7. An adsorber unit zeolite for use in an adsorber unit as claimed in claim 1, the adsorber unit zeolite being obtained by a process, wherein
a) a dry mixture of ammonium salts or N-containing compounds, $NH_3/NH_4$ zeolites and an iron compound, and also a compound of a monovalent metal, is prepared,
b) the above components are mixed intimately in a mill and
c) heat treated at a temperature of at least 300° C., and
d) finally cooled to room temperature, wherein the adsorber unit zeolite contains iron and a metal in +1 oxidation state that is copper, silver or gold, and has an iron content of 0.1-10% by weight based on the adsorber unit zeolite, and a proportion of metal in +1 oxidation state of 0.01-2% by weight based on the total weight of the adsorber unit zeolite, and wherein the adsorber unit zeolite has a desorption temperature for adsorbed hydrocarbons in the range of 350° to 410° C.

8. The adsorber unit zeolite as claimed in claim 7, wherein the zeolite material used in the process is a ZSM-5 type, MFI type or BETA type, in each case in the ammonium form.

9. The adsorber unit zeolite as claimed in claim 8, wherein in the process the mixture is exposed to a nitrogen-containing atmosphere during the heat treatment.

10. The adsorber unit zeolite as claimed in claim 9, wherein in the process the nitrogen-containing atmosphere contains ammonia or amine.

* * * * *